(12) United States Patent  (10) Patent No.: US 8,065,923 B2
Duhanyan et al.  (45) Date of Patent: Nov. 29, 2011

(54) METHOD AND APPARATUS FOR MEASURING THE FLOW RATES OF THE INDIVIDUAL PHASES OF A MULTIPHASE FLUID MIXTURE

(75) Inventors: Nora Duhanyan, Noisy-le-Grand (FR); Gilles Roux, Genevieve des Bois (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 404 days.

(21) Appl. No.: 11/817,760

(22) PCT Filed: Feb. 22, 2006

(86) PCT No.: PCT/EP2006/001774
§ 371 (c)(1),
(2), (4) Date: Jul. 1, 2008

(87) PCT Pub. No.: WO2006/094669
PCT Pub. Date: Sep. 14, 2006

(65) Prior Publication Data
US 2009/0000390 A1  Jan. 1, 2009

(30) Foreign Application Priority Data
Mar. 4, 2005  (EP) .................................. 05290503

(51) Int. Cl.
*G01F 1/74* (2006.01)
*G01F 1/34* (2006.01)
(52) U.S. Cl. ................ 73/861.42; 73/861.52; 73/861.04
(58) Field of Classification Search ............. 73/861.04, 73/861.42, 862.52, 862, 861.58, 861.61–861.64
See application file for complete search history.

(56) References Cited

U.S. PATENT DOCUMENTS

| | | | | |
|---|---|---|---|---|
| 4,788,852 A * | 12/1988 | Martin et al. | ................ | 73/61.44 |
| 4,856,344 A * | 8/1989 | Hunt | .......................... | 73/861.04 |
| 5,741,978 A * | 4/1998 | Gudmundsson | ........... | 73/861.04 |
| 6,097,786 A * | 8/2000 | Groves et al. | .................... | 378/53 |
| 6,265,713 B1 * | 7/2001 | Berard et al. | ............. | 73/861.04 |
| 6,389,908 B1 | 5/2002 | Chevalier et al. | | |
| 6,405,604 B1 * | 6/2002 | Berard et al. | ............. | 73/861.63 |
| 6,896,074 B2 | 5/2005 | Cook et al. | | |
| 6,910,388 B2 * | 6/2005 | Jones | ........................ | 73/861.63 |
| 6,993,979 B2 * | 2/2006 | Segeral | ..................... | 73/861.64 |
| 2003/0047308 A1 * | 3/2003 | Hirsch et al. | ............. | 166/250.15 |
| 2004/0046115 A1 | 3/2004 | Berard et al. | | |
| 2004/0248314 A1 | 12/2004 | Stephenson et al. | | |

* cited by examiner

*Primary Examiner* — Lisa Caputo
*Assistant Examiner* — Jonathan Dunlap
(74) *Attorney, Agent, or Firm* — Matthias Abrell; Daria Fonseca; Jeff Griffin

(57) ABSTRACT

A flow rate measuring method for a multiphase fluid mixture flowing into a line is provided. The method comprises the steps of passing the fluid mixture through a Venturi tube having a pressure drop, measuring a differential pressure across the Venturi tube and a line pressure of the fluid mixture, measuring by a second measuring device, measured parameter(s) of the fluid mixture correlated to first and second phase relative quantities, determining estimated parameter(s) of the fluid mixture correlated to the first and second phase relative quantities based on the measured parameter and an extrapolating scheme, determining phase flow rate(s) based on the differential pressure, the line pressure and the measured parameter(s) of the fluid mixture, and determining flow rate(s) based on the differential pressure, the line pressure of the fluid mixture and the estimated parameter(s) of the fluid mixture.

15 Claims, 7 Drawing Sheets

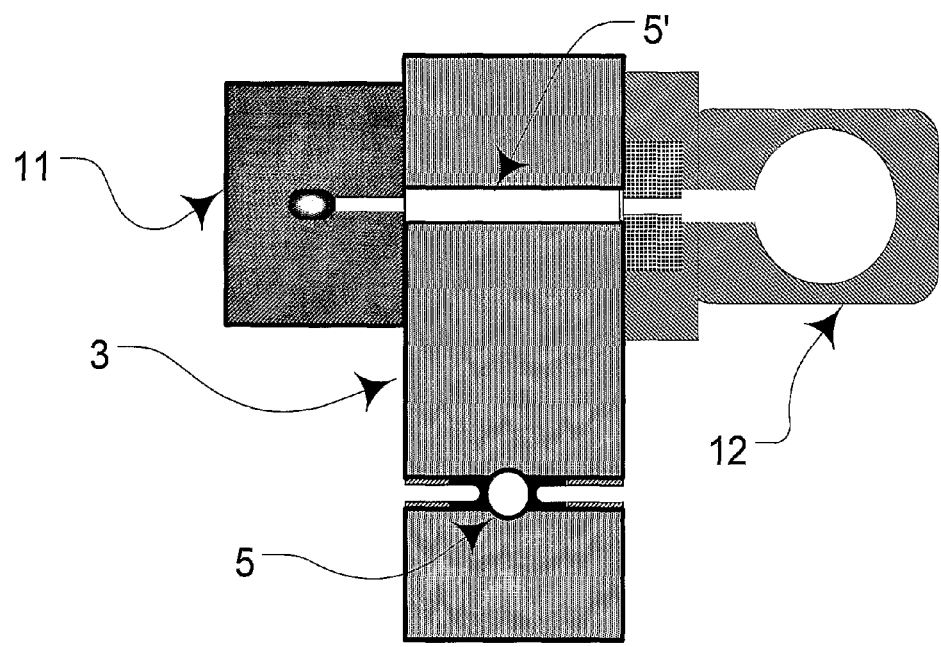
Figure 3.A
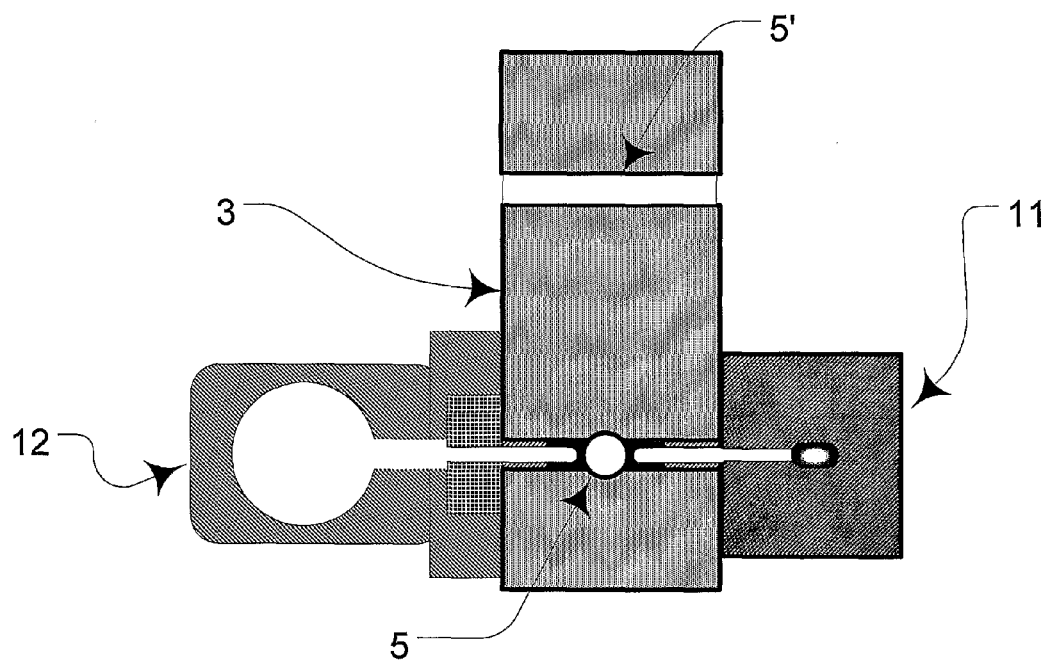
Figure 3.B

METHOD AND APPARATUS FOR MEASURING THE FLOW RATES OF THE INDIVIDUAL PHASES OF A MULTIPHASE FLUID MIXTURE

FIELD OF THE INVENTION

The invention relates to a method for measuring the flow rates of the individual phases of a multiphase fluid mixture.

The invention has a particular application in the oilfield industry, for measuring the flow rates of multiphase fluid mixtures like hydrocarbon well effluents comprising water, oil, and gas.

The invention also relates to an apparatus for implementing the method for measuring multiphase fluid mixture flow rates.

BACKGROUND OF THE INVENTION

A flow rate measurement method and apparatus adapted to hydrocarbon well effluents made up of multiphase fluid mixtures comprising water, oil, and gas is known from U.S. Pat. No. 6,405,604. The effluent is passed through a Venturi tube in which the effluent is subjected to a pressure drop, a mean value of the pressure drop is determined over a period of time. A mean value for the density and fractions of the fluid mixture at the constriction of the Venturi tube over said period is determined by means of a gamma ray producing source and an associated detector. A total mass flow rate value is deduced for the period under consideration from the measured mean values of pressure drop and of density. Subsequently, water, oil, and gas flow rates can be calculated from the measured fractions. The apparatus comprises a Venturi tube measuring device and a gamma ray measuring device.

Typically, the gamma ray measuring device is more costly than the Venturi tube measuring device. Further, the implementation of the gamma ray measuring device necessitates some constraints because of the use of a radioisotope. In addition, in case the gamma ray measuring device is removed from the flow rate measurement apparatus, it is not possible to determine water, oil, and gas flow rates anymore.

SUMMARY OF THE INVENTION

One part of the invention is a method and an apparatus for measuring multiphase fluid mixture flow rates based on a permanently installed differential pressure measuring arrangement at each measuring apparatus location and a mobile nuclear measuring arrangement. The method enables to permanently monitor the oil, water and gas flow rates of the multiphase fluid mixture by means of the differential pressure measuring arrangement when the nuclear measuring arrangement is removed and based on an estimation (e.g. an extrapolation) of the fraction of the various phases in the fluid mixture and a trending of said fraction over a determined period of time. Further, the method enables to recommend when a new nuclear measurement should be performed.

More precisely, a first aspect of the present invention relates to a flow rate measuring method for a multiphase fluid mixture flowing in a line, the fluid mixture comprising at least a first and a second phase, the method comprises the steps of:
  passing the fluid mixture through a first measuring device permanently installed on the line in which the fluid mixture is subjected to a pressure drop,
  continuously measuring with said first measuring device permanently installed on the line a differential pressure across the first measuring device and a line pressure of the fluid mixture in the line,
  punctually measuring at a determined instant with a second measuring device removably installed on the line at least one measured parameter of the fluid mixture correlated to the first phase quantity relatively to the second phase quantity,
  continuously determining at least one estimated parameter of the fluid mixture correlated to the first phase quantity relatively to the second phase quantity based on the punctually measured parameter and an extrapolation scheme, and
  determining at least one phase flow rate based on the differential pressure across the first measuring device, the line pressure of the fluid mixture into the line ($P_l$) and the at least one measured parameter of the fluid mixture when the second device is installed on the line, and
  determining at least one phase flow rate based on the differential pressure across the first measuring device, the line pressure of the fluid mixture in the line and the at least one estimated parameter of the fluid mixture when the second device is removed from the line.

Advantageously, the fluid mixture is a hydrocarbon multiphase fluid mixture comprising a liquid phase and a gas phase, the liquid phase comprising an oil phase and a water phase.

The first device may be a Venturi tube or nozzle or orifice plate type measuring arrangement.

The second device may be a nuclear measuring arrangement.

Preferably, in the case wherein a Venturi tube measuring arrangement is used, the method comprises the steps of:
  passing the fluid mixture through the Venturi tube permanently installed on the line in which the fluid mixture is subjected to a pressure drop,
  continuously measuring with said Venturi tube a differential pressure across the Venturi tube and a line pressure of the fluid mixture in the line,
  punctually measuring at a determined instant with a second measuring device removably installed on the line at least one measured parameter of the fluid mixture correlated to the first phase quantity relatively to the second phase quantity,
  continuously determining at least one estimated parameter of the fluid mixture correlated to the first phase quantity relatively to the second phase quantity based on the punctually measured parameter and an extrapolation scheme, and
  determining at least one phase flow rate based on the differential pressure across the Venturi, the line pressure of the fluid mixture into the line ($P_l$) and the at least one measured parameter of the fluid mixture when the second device is installed on the line, and
  determining at least one phase flow rate based on the differential pressure across the Venturi tube, the line pressure of the fluid mixture in the line and the at least one estimated parameter of the fluid mixture when the second device is removed from the line.

According to one aspect of the invention, the at least one estimated parameter of the fluid mixture correlated to the first phase quantity relatively to the second phase quantity is the water liquid ratio.

The water liquid ratio may be determined by extrapolation of a plurality of future values of water liquid ratio based on a plurality of preceding measured parameters of the fluid mixture.

The water liquid ratio may be calculated based on a well equation and on a measurement of a well bottom hole pressure.

According to another aspect of the invention, the at least one parameter of the fluid mixture correlated to the first phase quantity relatively to the second phase quantity is the gas oil ratio.

The gas oil ratio may be assumed to be constant between two consecutive installations of the second device on the line.

According to still another aspect of the invention, the method further comprises the steps of setting a flag that defines the determined instant when the second device is installed on the line, the determined instant being defined when the flag has reached a determined flag value.

The flag may be an error value associated with the estimated parameter and the determined instant may be defined when the error value has reached a determined error level.

The flag may be the differential pressure across the first measuring device and the determined instant may be defined when the differential pressure across the first measuring device has exceeded a determined differential pressure value.

According to still another aspect of the invention, the method further comprises the steps of:
 determining a discrepancy between the estimated parameter of the fluid mixture correlated to the first phase quantity relatively to the second phase quantity and the measured parameter of the fluid mixture correlated to the first phase quantity relatively to the second phase quantity,
 determining a time period separating two consecutive installations of the second device on the line by a trial and error method consisting in increasing said time period for a small discrepancy and decreasing said time period for a large discrepancy.

According to a further aspect, the invention relates to a flow rate measuring apparatus for a multiphase fluid mixture flowing in a line, the fluid mixture comprising at least a first and a second phase. The apparatus comprises:
 a first measuring device permanently installed on the line, said first measuring device comprising a restriction or throat in the line for subjecting the fluid mixture to a pressure drop, and said first measuring device measuring continuously a differential pressure across the first measuring device and a line pressure of the fluid mixture in the line,
 a second measuring device removably installed on the line for punctually measuring at a determined instant at least one measured parameter of the fluid mixture correlated to the first phase quantity relatively to the second phase quantity,
 an electronic arrangement for continuously determining at least one estimated parameter of the fluid mixture correlated to the first phase quantity relatively to the second phase quantity based on the punctually measured parameter and an extrapolation scheme, and determining at least one phase flow rate based on the differential pressure across the first measuring device, the line pressure of the fluid mixture in the line and the at least one measured parameter of the fluid mixture when the second measuring device is installed on the line, and determining at least one phase flow rate based on the differential pressure across the first measuring device, the line pressure of the fluid mixture in the line and the at least one estimated parameter of the fluid mixture when the measuring device is removed from the line.

The first device may be a Venturi tube or nozzle or orifice plate type measuring arrangement.

Preferably, in the case wherein a Venturi tube measuring arrangement is used, the apparatus comprises:
 a convergent Venturi section permanently installed on the line comprising a throat for subjecting the fluid mixture passing through the convergent Venturi section to a pressure drop, and at said Venturi section continuously measuring a differential pressure across the Venturi section and a line pressure of the fluid mixture in the line,
 a second measuring device removably installed on the line for punctually measuring at a determined instant at least one measured parameter of the fluid mixture correlated to the first phase quantity relatively to the second phase quantity,
 an electronic arrangement for continuously determining at least one estimated parameter of the fluid mixture correlated to the first phase quantity relatively to the second phase quantity based on the punctually measured parameter and an extrapolation scheme, and determining at least one phase flow rate based on the differential pressure across the Venturi, the line pressure of the fluid mixture in the line and the at least one measured parameter of the fluid mixture when the second measuring device is installed on the line, and determining at least one phase flow rate based on the differential pressure across the Venturi tube, the line pressure of the fluid mixture in the line and the at least one estimated parameter of the fluid mixture when the measuring device is removed from the line.

Thus, the measuring method and apparatus according to the invention is less expensive to implement than previous measuring method and apparatus while maintaining a similar accuracy. Because the Venturi tube or nozzle or orifice plate type measuring arrangement of the flow rates measuring apparatus is inexpensive relatively to the nuclear measuring arrangement, it may be is installed on each wellhead of a hydrocarbon exploitation site. One mobile nuclear measuring arrangement may be moved from location to location by a field engineer to obtain short-term measurements (spot checks) on request or on a periodic schedule, or on a determined instant based on a recommendation. Consequently, a client of such measurement will pay for the permanently installed measuring arrangements and from time-to-time for a nuclear measurement service while still continually monitoring each well flow of the hydrocarbon exploitation site between consecutive nuclear measurements.

As a further advantage, the measuring apparatus of the invention comprises an empty pipe part which enables performing an in-situ reference measurement on the measuring apparatus installed on a line in which a fluid mixture is flowing.

BRIEF DESCRIPTION OF THE DRAWINGS

The present invention is illustrated by way of example and not limited to the accompanying figures, in which like references indicate similar elements:

FIGS. 2, 3.A and 3.B diagrammatically show the apparatus for measuring multiphase fluid mixture flow rates;

DETAILED DESCRIPTION OF THE INVENTION

Figure 1:
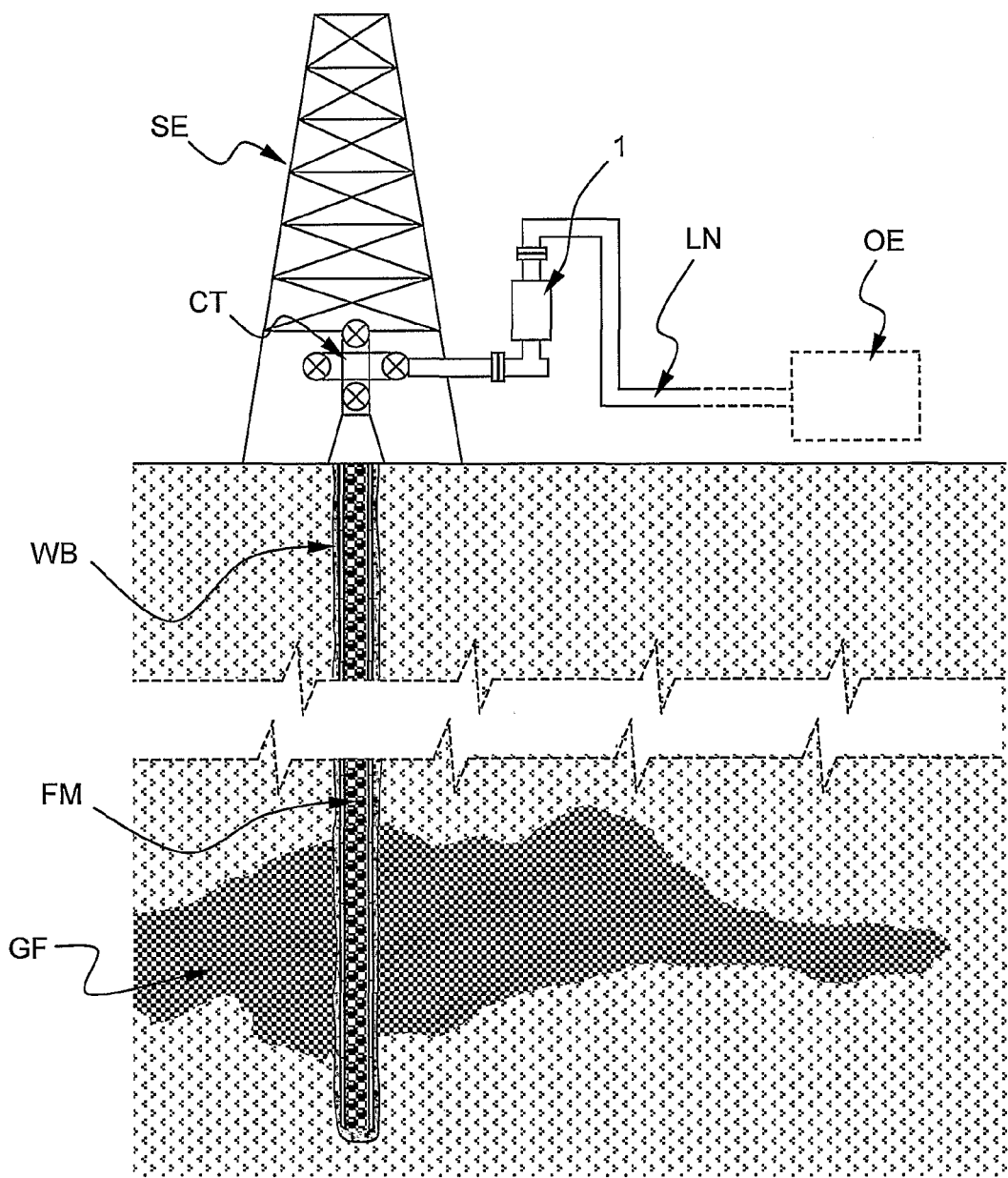
FIG. 1 schematically illustrates a typical onshore hydrocarbon well location.

FIG. 1 shows, in a highly schematic manner, a typical onshore hydrocarbon well location and surface equipments SE above a hydrocarbon geological formation GF after a well-bore WB drilling operation has been carried out, after a casing string has been run, after cementing operations have been carried out and exploitation has begun. A fluid mixture FM flows from selected zones of the hydrocarbon geological formation GF out of the well from a wellhead CT (for example a Christmas tree). The wellhead is coupled to other surface equipment OE by a flow line LN. The surface equipment OE may typically comprise a chain of elements connected together (e.g. a pressure reducer, a heat exchanger, a burner, etc). An apparatus 1 which is typically coupled to the flow line LN measures multiphase fluid mixture FM flow rates.

Figure 2:
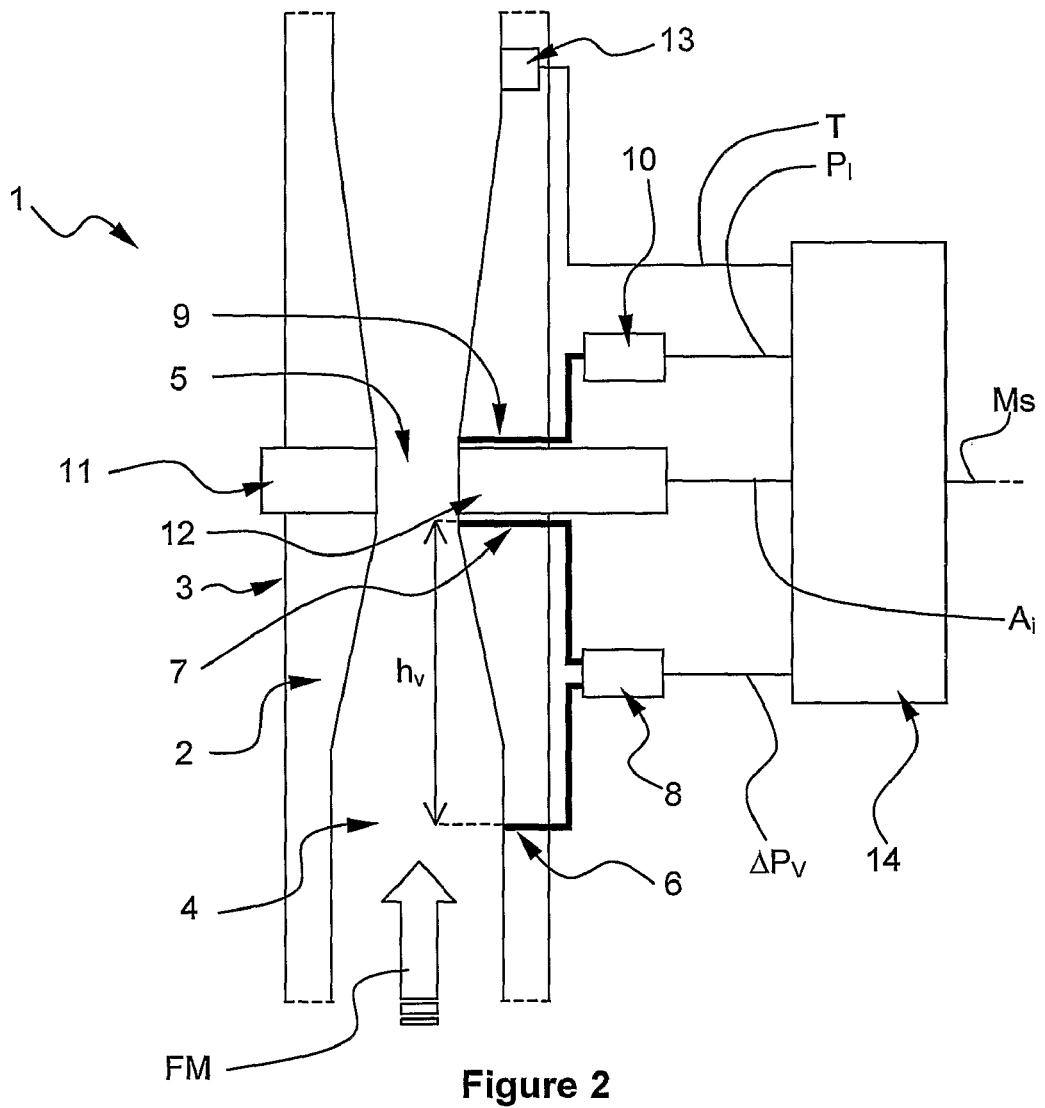

FIG. 2 diagrammatically shows the apparatus 1 for measuring multiphase fluid mixture FM flow rates. The apparatus 1 comprises a pipe section 3 which internal diameter gradually decreases from an upstream part 4 to a throat 5, forming a convergent Venturi section 2. The convergent Venturi section induces a pressure drop between the upstream part 4 and the throat 5. The pipe section 3 can be coupled to any flowing line LN by any appropriate coupling arrangement.

The apparatus 1 comprises a differential pressure sensor 8 for measuring said pressure drop $\Delta P_V$. The differential pressure sensor 8 comprises a first 6 and a second 7 pressure tap sensibly positioned in the upstream part 4 and in the throat 5, respectively. The apparatus 1 comprises a pressure sensor 10 for measuring the pressure $P_l$ in the Venturi throat 5. The pressure sensor 10 may comprise a third pressure tap 9. The third pressure tap may sensibly be positioned into the throat 5.

The Venturi section 2, the differential pressure sensor 8 and the pressure sensor 10 constitute a first measuring device also referred as a Venturi measuring arrangement.

The apparatus 1 also comprises a temperature sensor 13 for measuring the temperature T of the fluid mixture FM.

The measurements $P_l$ and T enable to determine the conditions of pressure and temperature of the flowing fluid mixture FM.

The apparatus 1 further comprises a gamma source 11 and a detector 12 for measuring the density and fractions of the fluid mixture FM. The gamma source 11 and the detector 12 are diametrically positioned on each opposite sides of the throat 5 in appropriate housing of the pipe section 3.

The gamma source 11 is a gamma ray producing source. Preferably, the source produces gamma rays at two different energy levels (a high energy level and a low energy level). For example, the source 11 is made of the radioisotope Barium 133 producing several high energy gamma rays with a peak at a high energy of 356,81 keV and low energy gamma rays with a peak at a low energy of 32 keV.

The detector 12 comprises a scintillator crystal (e.g. NaITi) and a photomultiplier. The detector measures the count rates of low and high energy gamma photons passing through the fluid mixture. The detector provides two series of signals Ai, representative of the numbers of photons detected per sampling period in a high and low energy range.

Preferably, the housing of the pipe receiving the source and the detector comprises appropriate windows made of a material showing low absorption of the low and high energy gamma rays.

Based on the measured attenuation of the high energy gamma rays, it is possible to determine the density of the fluid mixture FM.

Based on the measured attenuation of the low energy gamma rays, it is possible to determine the water content of the fluid mixture FM.

The source 11 and the detector 12 constitute a second measuring device also referred as a nuclear measuring arrangement.

The differential pressure sensor 8, the pressure sensor 10, the detector 12 and the temperature sensor 13 are coupled to an electronic arrangement 14. The electronic arrangement 14 determines the flow rates of the individual phases of the multiphase fluid mixture based on measurements provided by the Venturi measuring arrangement and the nuclear measuring arrangement.

FIGS. 3.A and 3.B are top cross-section views at the throat level of the apparatus shown in FIG. 2. The pipe section 3 comprises an empty pipe measurement section 5' which is used for source counts rate normalization purposes. Preferably, the empty pipe section is positioned closely to the throat 5 of the Venturi measurement section.

An empty pipe master calibration is performed at the end of the apparatus manufacturing process. Subsequently, an empty pipe calibration (FIG. 3.A) is performed before each time a new nuclear measuring arrangement is coupled to the Venturi pipe section (FIG. 3.B).

A set of transformation coefficients will be applied to the empty pipe measurement to recompute the empty pipe count rate that applies to the Venturi throat. These transformation coefficients will be determined during the master calibration, at the end of the manufacturing process, by measuring counts rates of the low and high energy gamma rays on both empty pipe section and Venturi section with the same source and detector.

Thus, the source and detector used for different nuclear measuring sessions can be different without affecting the overall determination of the individual phase flow rates.

The determination of the flow rates of the individual phases of a multiphase fluid mixture based on Venturi measurements and nuclear measurement will be explained hereinafter.

Figure 4:
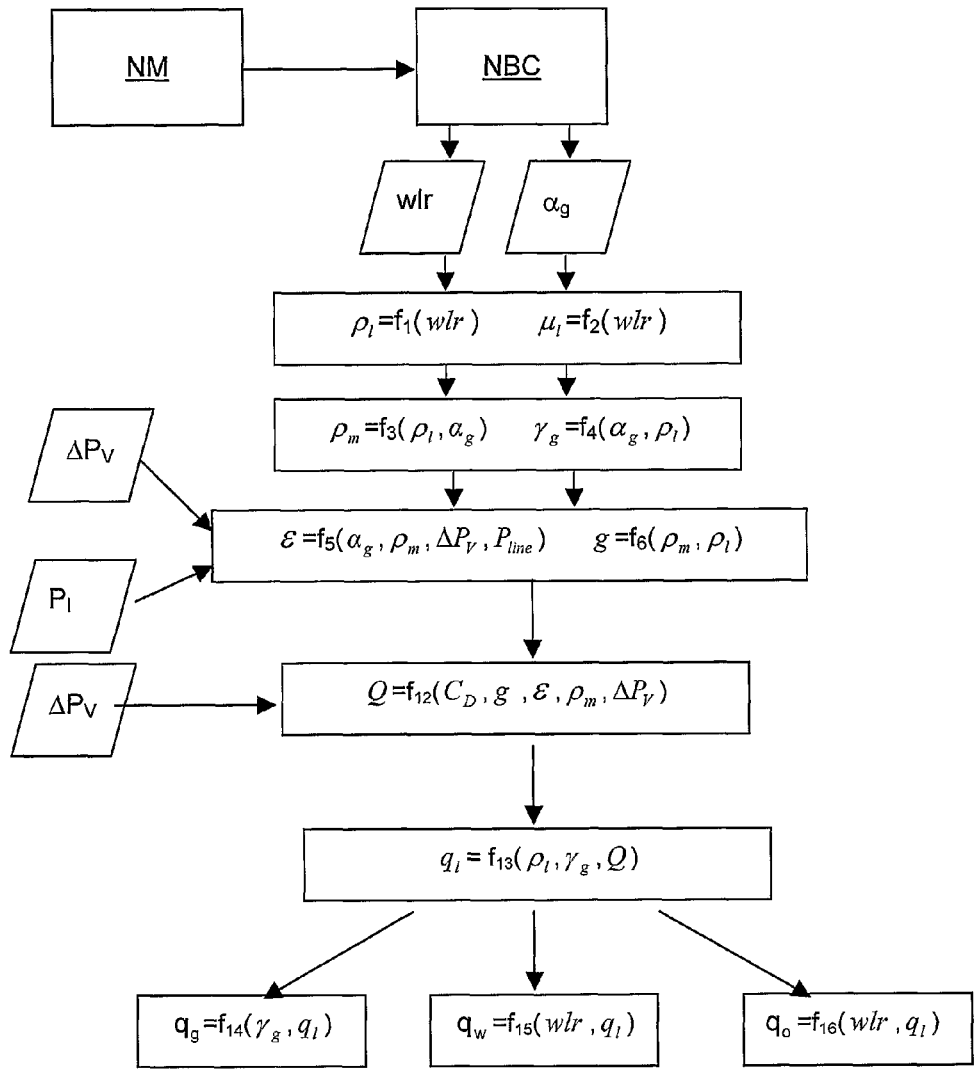
FIG. 4 diagrammatically illustrates the calculation with nuclear measurements of the gas phase, oil phase and water phase flow rate, respectively.

FIG. 4 diagrammatically illustrates the calculation of the gas phase, oil phase and water phase flow rate, respectively. It is to be noted that for clarity purposes, the constants and the PVT updated physical parameters are not shown in the Figure. These calculations are based on an interpretation model and on measurements. The Venturi measuring arrangement provides the line temperature $T_l(t)$, differential pressure across the Venturi pressure tapping $\Delta P_V(t)$ and line pressure $P_l(t)$ measurements at the Venturi throat. The nuclear measuring arrangement NM provides after calculation NBC the fluid composition measurement, in particular the water liquid ratio wlr(t) and the gas fraction $\alpha_g(t)$. The water liquid ratio wlr(t) is the ratio between the water fraction $\alpha_w$ and the liquid fraction $\alpha_l$: wlr(t)=$\alpha_w/\alpha_l$.

The interpretation model is based on empirical formulae, which are dependent on the size of the Venturi throat.

Typical examples of constant used with regards to the interpretation model are:
the Venturi throat diameter $D_{th}$,
the cross sectional area of the throat $A_{th}$ m$^2$
the ratio of the throat to inlet diameters $$\beta = \frac{D_{th}}{D_{in}} = 0.5,$$

the distance between the differential pressure tapping $h_V$, the acceleration due to gravity $g_{acc}$=9.81 m/s$^2$, the isentropic exponent $\gamma$, The oil $\rho_o$, water $\rho_w$ and gas $\rho_g$ single phase densities (SI unit kg/m$^3$), and the oil $\mu_o$ and water $\mu_w$ single phase dynamic viscosities (SI unit kg/m/s) are physical parameters known at ambient or standard conditions. Indeed, samples of the different single phases are analyzed regularly or, at least, at the beginning of each measurement campaign. During the measurements, the values of the physical parameters are continually updated in time with respect to $P_l(t)$ and $T_l(t)$ using PVT computations.

The different functions that are calculated in order to deduce the gas, oil and water flow rates based on the above mentioned constants and variables will be described hereinafter. These functions are presented in the order in which they are defined and used in the model. The following calculations are performed at line conditions.

The mixture density $\rho_m$ and liquid density $\rho_l$ are given by:

$\rho_m = (1-\alpha_g)\rho_l + \alpha_g \rho_g$, where $\rho_l = f_1(wlr) = wlr\rho_w + (1-wlr)\rho_o$.

For simplicity, the following function is defined:

$$g \underset{def}{=} f_6(\rho_m, \rho_l) = \sqrt{\frac{\rho_m}{\rho_l}}.$$

The gas expansion factor $\epsilon$, which enables the model to take the gas phase dilatation/contraction phenomena into account, is calculated as follows:

$\epsilon = f_5(\alpha_g, \rho_m, \Delta P_V, P_l)$

The total mass flow rate Q is given by:

$Q = f_{12}(C_D, g, \epsilon, \rho_m, \Delta P_V)$.

The gas cut $\gamma_g$ is calculated using an empirical relation known under the name of "slip law".

$\gamma_g = \alpha_g + \delta(\alpha_g)$, where $\delta_g$ is the slip law term and represents a positive correction dependent on fluid properties.

The volumetric liquid flow rate $q_l$ is given by $$q_l = f_{13}(\rho_l, \gamma_g, Q) = \frac{Q}{\rho_g \frac{\gamma_g}{1-\gamma_g} + \rho_l}.$$

The volumetric single phase flow rates of gas $q_g$, water $q_w$, and oil $q_o$ are given by:

$$q_g = f_{14}(\gamma_g, q_l) = \frac{\gamma_g}{1-\gamma_g} q_l$$

$q_w = f_{15}(wlr, q_l) = wlr\, q_l$, and $q_o = f_{16}(wlr, q_l) = (1-wlr)q_l$.

The determination of the flow rates of the individual phases of a multiphase fluid mixture based on measurements made with a Venturi measuring arrangement when nuclear measurements are not available will be explained hereinafter.

Figure 5:
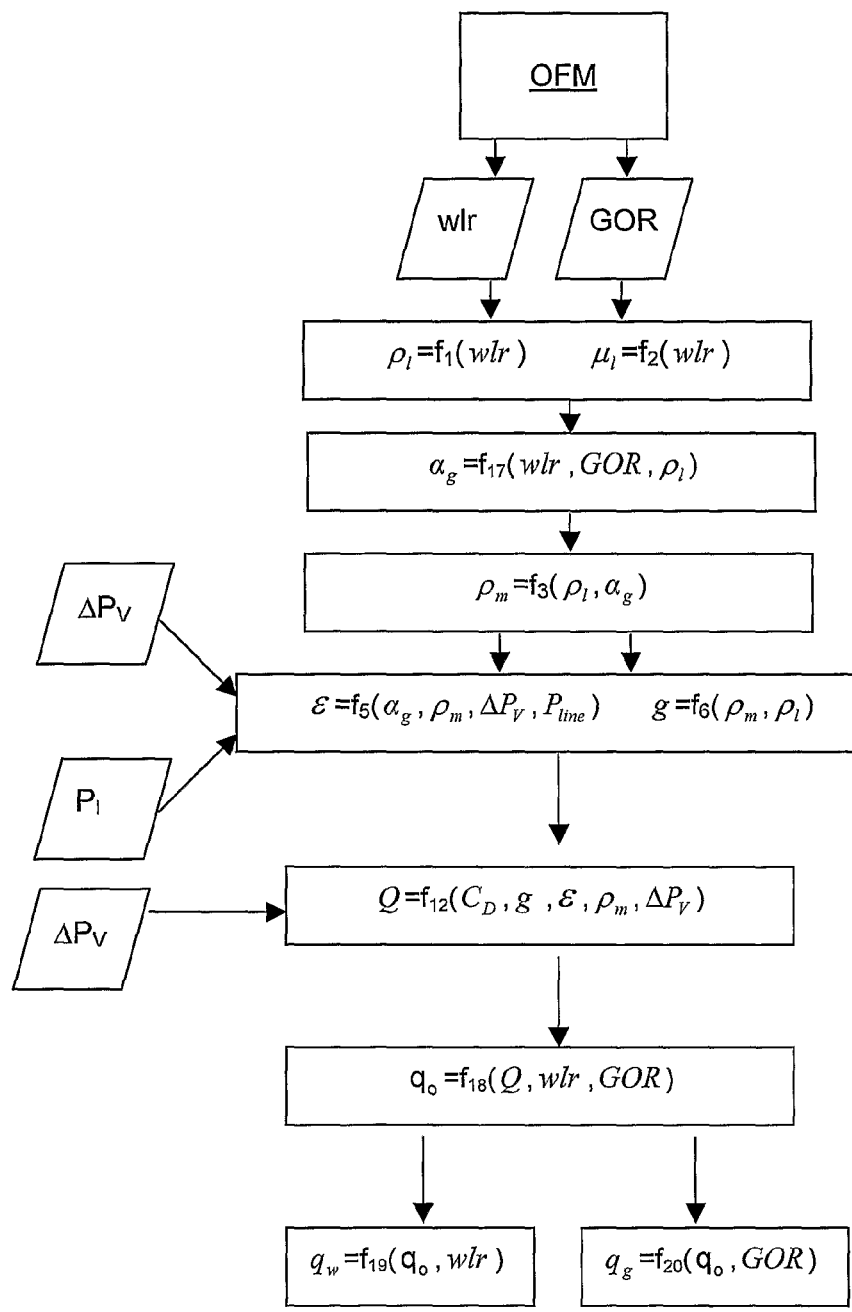
FIG. 5 diagrammatically illustrates the calculation without nuclear measurements of the gas phase, oil phase and water phase flow rate, respectively.

FIG. 5 diagrammatically illustrates the calculation of the gas phase, oil phase and water phase flow rate, respectively. It is to be noted that for clarity purposes, the constants and the PVT updated physical parameters are not shown in the Figure. These calculations are based on an interpretation model and on measurements. The Venturi measuring arrangement provides the line temperature $T_l(t)$, differential pressure across the Venturi pressure tapping $\Delta P_V(t)$ and line pressure $P_l(t)$ measurements at the Venturi throat.

The interpretation model is based on empirical formulae, slip law and viscous discharge coefficient, which depend on the size of the Venturi throat.

As the nuclear measuring arrangement is removed, the nuclear measurements are not available anymore. The nuclear measurements are replaced by two other fluid characteristic parameters, namely the gas oil ratio GOR=$q_g/q_o$ (where $q_g$ and $q_o$ designate the gas and oil volumetric flow rates, respectively) and the water liquid ratio wlr=$\alpha_w/\alpha_l$.

The values of these parameters have to be determined with the help of field-derived information.

The liquid density $\rho_l$ is given by $\rho_l = f_1(wlr) = wlr\, Pw + (1-wlr)\rho_o$ The gas hold up:

$\alpha_g = f_{17}(wlr, GOR, \rho_l)$ is a solution of the following equation:

$K_g \cdot \alpha_g^{Mg} + [1+GOR(1-wlr)]\alpha_g - GOR(1-wlr) = 0$, where $K_g$ and $M_g$ are empirical coefficients for slip correction.

There may be several solutions to this equation but only one belongs to the range of interest, namely between 0 and 1.

The mixture density $\rho_m$ and the function g are given by:

$$\rho_m = f_3(\rho_l, \alpha_g) = (1-\alpha_g)\rho_l + \alpha_g \rho_g \text{ and}$$

$$g \underset{def}{=} f_6(\rho_m, \rho_l) = \sqrt{\frac{\rho_m}{\rho_l}}$$

The total mass flow rate Q is given by:

$Q = f_{12}(C_D, g, \epsilon, \rho_m, \Delta P_V)$.

The single-phase volumetric flow rates, namely oil flow rate $q_o$, water flow rate $q_w$ and gas flow rate $q_g$ can be formulated using the gas oil ratio GOR and water liquid ratio wlr, namely:

$$q_o = f_{18}(Q, wlr, GOR) = \frac{Q}{\rho_w \frac{wlr}{1-wlr} + \rho_o + \rho_g GOR},$$

$$q_w = f_{19}(q_o, wlr) = \frac{wlr}{1-wlr} q_o \text{ and}$$

$q_g = f_{20}(q_o, GOR) = GOR\, q_o$.

Thus, if the gas oil ratio GOR and water liquid ratio wlr are known, then the flow rates are easily calculated from differential pressure across the Venturi tube pressure tappings $\Delta P_V(t)$ and line pressure $P_l(t)$ measurements at the Venturi.

The gas oil ratio GOR and water liquid ratio wlr are depends on the hydrocarbon reservoir and the hydrocarbon well. They may be estimated between successive nuclear measurements. This estimation is based on the extrapolated evolution of the gas oil ratio GOR and water liquid ratio wlr. Advantageously, these extrapolations may be adjusted or corrected by means of punctual nuclear measurements.

A first assumption that can be made is that for wells of which the oil production is stable, the gas oil ratio GOR can be assumed to be constant over a certain period of time. Typically, this period of time is of the order of a few months.

The gas oil ratio GOR can be determined at an initial value during an initial nuclear measurement. This value is assumed constant till the next nuclear measurement at which it can be updated. Preferably, the time period separating two nuclear measurements is smaller than the time period during which the gas oil ratio GOR can be assumed to be constant.

A second assumption that can be made is that the water liquid ratio wlr evolves according to a particular water liquid ratio time profile wlr(t). Thus, it is possible to anticipate the water liquid ratio wlr values, which will be used in order to calculate the phase flow rates between consecutive nuclear measurements.

According to a first scheme, the water liquid ratio time profile wlr(t) is known based on the historical knowledge of the considered well.

According to a second scheme, the water liquid ratio time profile wlr(t) is determined by extrapolation of the future values of water liquid ratio wlr based on each nuclear measurement.

Figure 6:
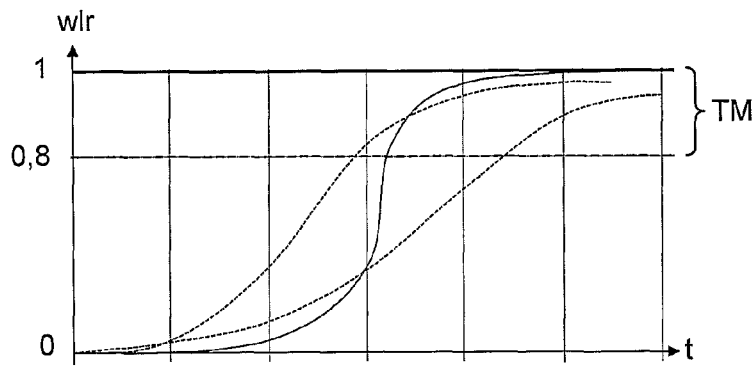
FIG. 6 illustrates a typical water liquid ratio time profile and its corresponding range of variation during the life of a hydrocarbon reservoir and well.

FIG. 6 illustrates a typical water liquid ratio time profile wlr(t) and its corresponding range of variation during the life of a hydrocarbon reservoir and well. The water liquid ratio time profile wlr(t) sensibly evolves between a first asymptote wlr=0 and a second asymptote wlr=1. In the frame of the low tiers market TM in the field of a hydrocarbon reservoir and well exploitation, it is most probable that only the upper part of the water liquid ratio time profile wlr(t) will be observed.

Figure 7:
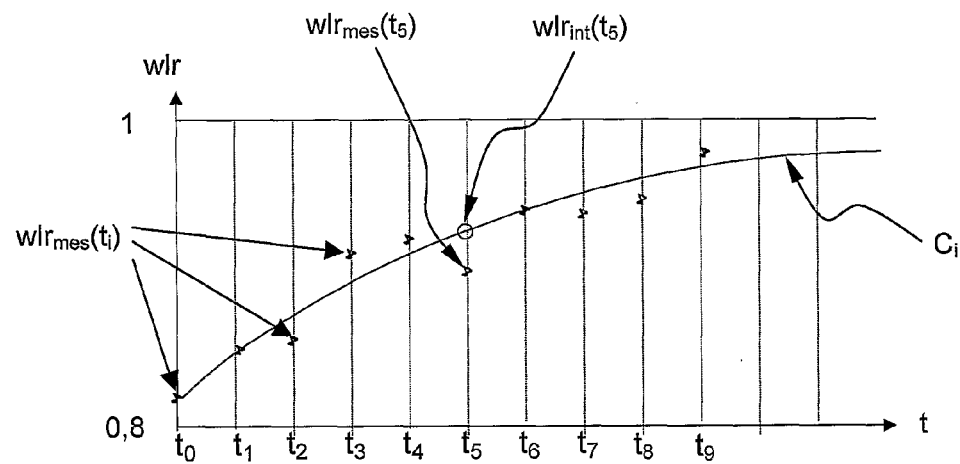
FIGS. 7 and 8 illustrate a typical water liquid ratio time profile and its corresponding range of variation during the life of a hydrocarbon reservoir and well for the low tiers market.
Figure 8:
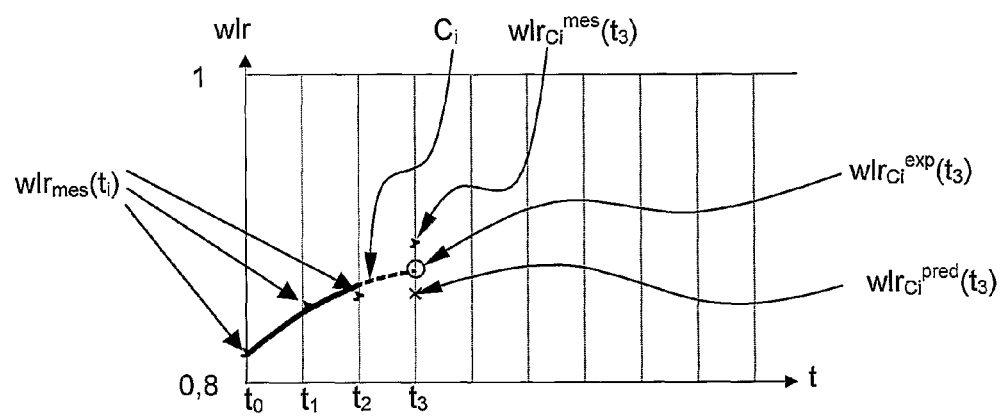

FIGS. 7 and 8 illustrate a typical example of water liquid ratio time profile wlr(t) for a hydrocarbon reservoir and well of the low tiers market. The water liquid ratio time profile wlr(t) is strictly monotonous.

In FIG. 7, the curve $C_i$ is the interpolation of the measured $wlr_{mes}$ points. The measured $wlr_{mes}$ points are provided by the nuclear measurements. Obviously, a difference may exist between an interpolated water liquid ratio at a determined instant $wlr_{int}(t5)$ and the effectively measured water liquid ratio at the same instant $wlr_{mes}(t5)$. This affects in which measure the value of wlr can be reasonably anticipated until the next nuclear measurement.

In FIG. 8, the curve $C_i$ is the curve interpolating the measured values of water liquid ratio $wlr_{mer}(t_i)$ between an initial time $t_0$ and the time $t_i$. For example, the extrapolated water liquid ratio $wlr_{C_i}^{exp}(t_3)$ is the value of water liquid ratio at time $t_3$ according to the curve $C_i$. At time $t_3$, an anticipation of the value of the water liquid ratio wlr can be made with the help of $C_i$, which is then extrapolated between the time $t_i$ and subsequent time $t_{i+1}$. The water liquid ratio $wlr_{C-1i}^{pred}(t_3)$ is the predicted value of wlr, according to the curve $C_{i-1}$, for the time $t_3$.

Because the water liquid ratio wlr(t) is monotonous, its curve can be interpolated with precision.

The interpolation error $\chi(t_{i+1})$ can be calculated as follows:

$$\chi(t_{i+1}) = \frac{|wlr_{C_{i+1}}^{exp}(t_{i+1}) - wlr_{C_i}^{pred}(t_{i+1})|}{t_{i+1} - t_i}$$

Figure 9:
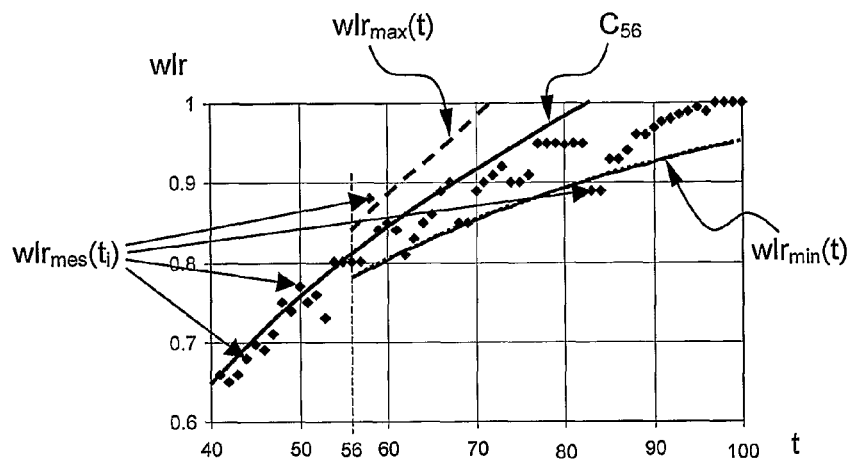
FIG. 9 shows measured water liquid ratio values and water liquid ratio extrapolation curves.

FIG. 9 illustrates how the dispersion of the measured points around the interpolation curves is taken into account by calculating the standard deviation of the water liquid ratio $\sigma_{wlr}$ between the latest interpolation curve and the measured points $wlr_{mes}(t_i)$. In the example of FIG. 9, an interpolation curve $C_{56}$ is determined based on a plurality of water liquid ratio value measured before time 56. Subsequently, the interpolation curve $C_{56}$ is compared to the water liquid ratio measured points $wlr_{mes}(t_i)$ after time 56. An average value of the standard deviation of water liquid ratio at time $t_i$ with respect to the curve $C_i$, namely $\sigma_{wlr,Ci}(t_i)$ can be calculated as follows:

$$\overline{\sigma_{wlr,C_l}(t_i)} = \frac{\sum_{j=1}^{i \in IN} \sigma_{wlr,C_l}(t_j)}{i}$$

and $$\sigma_{wlr}(t_i) \underset{def}{=} \max[\overline{\sigma_{wlr,C_l}(t_i)}; \sigma_{wlr,C_l}(t_i)]$$

The water liquid ratio wlr(t) may vary in the following range, i.e. between $wlr_{min}(t)$ and $wlr_{max}(t)$, between two nuclear measurements:

$$\underbrace{wlr_{C_i}^{pred}(t) - \chi_{C_i'}(t_i)(t - t_i) - \sigma_{wlr}(t_i)}_{wlr_{min}(t)} \le$$

$$wlr(t) \le \underbrace{wlr_{C_i}^{pred}(t) + \chi_{C_i'}(t_i)(t - t_i) + \sigma_{wlr}(t_i)}_{wlr_{max}(t)}$$

Figure 10:
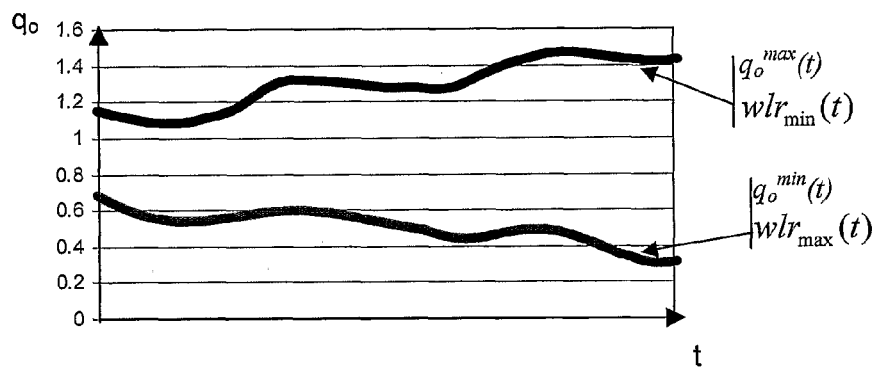
FIG. 10 illustrates the range of variation of the oil volumetric flow rate.

Thus, a range of variation of the single-phase volumetric flow rates can be calculated. FIG. 10 illustrates the range of variation of the oil volumetric flow rate. The maximum values of the oil volumetric flow rate $q_o^{max}(t)$ are calculated based on the minimum water liquid ratio $wlr_{min}(t)$. The minimum values of the oil volumetric flow rate $q_o^{min}(t)$ are calculated based on the maximum water liquid ratio $wlr_{max}(t)$. This range varies in time also with respect to the measurements continually made at the Venturi measuring arrangement (i.e. the line temperature $T_l(t)$, the differential pressure across the Venturi pressure tappings $\Delta P_V(t)$ and the line pressure $P_l(t)$ measurements).

Typically, the divergence of the curves is due to the error range prediction and the undulation, to the line temperature, the differential pressure across the Venturi pressure tappings and the line pressure variation in time.

According to a third scheme, the water liquid ratio time profile wlr(t) is determined from a so-called well equation.

The well equation is usually given by: $BHP - P_l = \Delta P_{hyd} + \Delta P_{fri} + \Delta P_{Cho}$, where BHP designates the well bottom hole pressure, $\Delta P_{hyd}$ designates the differential pressure induced by the well hydrostatic pressure, $\Delta P_{fri}$ designates the pressure loss induced by the viscous forces at the flowing line walls, and $\Delta P_{Cho}$ designates the pressure loss through a choke.

The choke may be considered as non-critical when positioned between the wellhead and the Venturi measuring arrangement, particularly for the low tiers market.

More precisely, the well equation is given by:

$$BHP - P_{line} = \rho_m^{well} g_{acc} h_{well} + \frac{8}{\pi^2} K_{friction} \frac{h_{well}}{D_{pipe}^5} \frac{Q^2}{\rho_m^{well}} + \frac{1}{2A_{ch}^2} K_{choke} \frac{Q^2}{\rho_m^{well}}$$

where:
$\rho_m^{well}$ designates the density of the mixture flowing between the bottom of the well and the Venturi measuring arrangement,
$h_{well}$ designates the well height,
$D_{pipe}$ designates the flowing line diameter,
$A_{choke}$ designates the cross sectional area of the choke,
Q designates the total mass flow rate,
$K_{choke}$ designates the choke pressure loss coefficient which value can be found in tables, and
$K_{friction}$ designates the frictional pressure loss coefficient.

The frictional pressure loss coefficient $K_{friction}$ can be extracted from the following relations based on the Colebrook correlation:

$$Re_{well} = \frac{4}{\pi} \frac{Q}{D_{pipe}} \frac{1}{\mu_{well}}$$

If $Re_{well}$<2000 (laminar flow) then:

$$K_{friction} = \frac{64}{Re_{well}}$$

If $Re_{well}$>3000 (turbulent flow) then:

$$\frac{1}{\sqrt{K_{friction}}} = -2\log_{10}\left(\frac{2.51}{Re_{well}\sqrt{K_{friction}}} + \frac{\varsigma_{pipe}}{D_{pipe}} \frac{1}{3.7}\right)$$

Where $Re_{well}$ is the Reynolds number of the fluid mixture flowing between the bottom of the well and the Venturi, $\mu_{well}$ is the dynamic viscosity of the mixture flowing in the well, and $\varsigma_{pipe}$ is the flowing line roughness.

In order to simplify the well equation, the following assumptions can be made:
the fluid mixture flowing in the flowing line, between the bottom of the well and the Venturi throat, is totally liquid,
the water liquid ratio wlr and the liquid mixture dynamic viscosity $\mu_l$ do not vary between the bottom of the well and the Venturi throat,
$\rho_m^{well} = \rho_l = wlr\rho_w + (1-wlr)\rho_o$ where wlr is the water liquid ratio at the Venturi throat, and
$\mu_{well} = \mu_l$.

Then, the well equation becomes (the total mass flow rate Q is replaced by its expression):

$$\Delta P_V = \frac{1}{AC^2\rho_m}[(BHP - P_{line})\rho_l - B\rho_l^2 + AC^2\rho_m^2 g_{acc} h_V]$$

where the parameters A, B and C are defined as (the others parameters have been described hereinbefore):

$$\begin{cases} A = \frac{8}{\pi^2} K_{friction} \frac{h_{well}}{D_{pipe}^5} + \frac{1}{2A_{ch}^2} K_{choke} \\ B = g_{acc} h_{wall} \\ C = K_{th} C_D A_{th} \end{cases}$$

Thus, the well equation links the differential pressure across the Venturi pressure tapping $\Delta P_V(t)$, the line pressure $P_l(t)$ measurements and the well bottom hole pressure BHP(t), and the water liquid ratio wlr(t) can be deduced from the differential pressure $\Delta P_V(t)$, the line pressure $P_l(t)$ and the well bottom hole pressure BHP(t) measurements.

In case the well equation is validated for an individual well, the use of the well equation is advantageous because the measured values of well bottom hole pressure BHP(t) are sufficient to determined the water liquid ratio wlr(t). Thus, the various constants of the model which have been determined during a validation process do not need corrections. Subsequently, the nuclear measurements are used only to determine the gas oil ratio GOR and/or to satisfy punctual requirements of the client exploiting the well.

Figure 11:
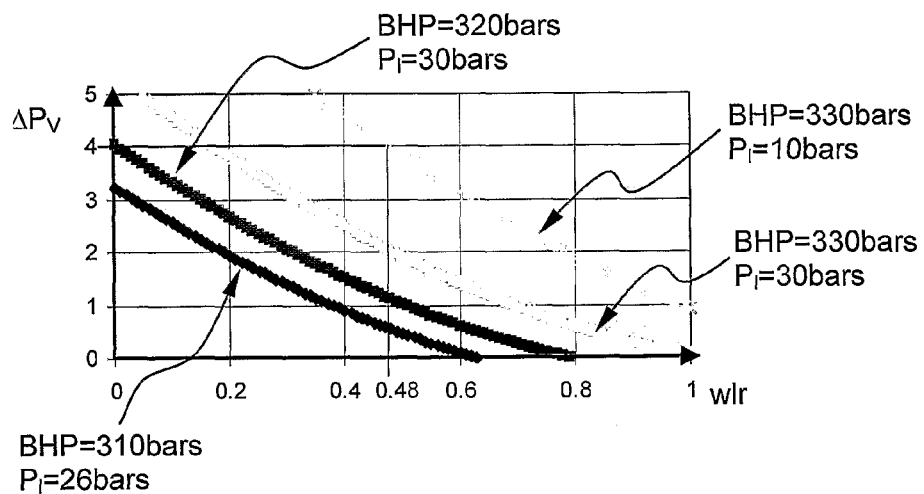
FIG. 11 shows various curves representing the evolution of the differential pressure relatively to the water liquid ratio for various well bottom hole pressure and line pressure pairs.

FIG. 11 shows various curves representing the evolution of the differential pressure $\Delta P_V(t)$ relatively to the water liquid ratio wlr(t) for various well bottom hole pressure and line pressure pairs [BHP;$P_l(t)$].

In a first step, after measurement of the well bottom hole pressure BHP(t) and the line pressure $P_l(t)$, a curve sensibly corresponding to this particular-pair is selected. In a second step, after measurement of the differential pressure $\Delta P_V(t)$, the selected curve directly gives the value of the water liquid ratio wlr. For example, for a well bottom hole pressure BHP of 330 bars and a line pressure $P_l$ of 10 bars, and a differential pressure $\Delta P_V$ of 4 bars, the water liquid ratio wlr value is 0.48.

As an alternative, in case the well bottom hole pressure BHP(t) cannot be determined and in case BHP is supposed to vary slowly in time, then its value can be assessed during the nuclear measurements and assumed to be constant until the next nuclear measurement. This is typically the case in well-known secondary recovery processes (e.g. water injection). In this particular case, the well bottom hole pressure BHP(t) does not vary much in time, while the water liquid ratio wlr and the line pressure continue to vary. The time range during which the well bottom hole pressure BHP(t) can be assumed constant, has to be identified for each hydrocarbon reservoir and well exploitation.

The determination of the optimum time period between consecutive nuclear calibrations will be explained hereinafter.

According to a first alternative, the time period $\Delta t$ between consecutive nuclear measurements or calibrations can be evaluated by a trial and error method. In a first step, a value is attributed to the time period $\Delta t$. This value is chosen in good agreement with the time period over which the gas oil ratio GOR may be assumed to be constant. In a second step, namely at each new nuclear measurements, the discrepancies between the measured and the predicted values of water liquid ratio wlr are calculated. Depending of said discrepancies, the value of the time period $\Delta t$ is increased (in case of small discrepancies) or decreased (in case of large discrepancies). An optimum value of the time period $\Delta t$ can be found after a certain number of steps.

According to a second alternative, the time period $\Delta t$ between consecutive nuclear measurements or calibrations can be evaluated by using a flag.

In a first example, the flag corresponds to a range of precision in which the oil flow rates has to be determined. When the range $[q_o^{min}(t); q_o^{max}(t)]$ in which the calculated oil flow rates evolve (see FIG. 10), is larger than a determined precision range, a recommendation to perform nuclear measurements is activated.

In a second example, the flag corresponds to a measurement of the differential pressure across the Venturi $\Delta P_V$. When the differential pressure across the Venturi $\Delta P_V$ deviates from a determined value by a determined amount, a recommendation to perform nuclear measurements is activated. Indeed, when the differential pressure is changing by a certain value, it corresponds to an important change in the fluid mixture flow.

In a third example, the flag corresponds to a comparison on the one side, of the water liquid ratio $wlr_{well}$ determined via the well equation based on the measured differential pressure across the Venturi pressure tapping $\Delta P_V(t)$, the measured line pressure $P_l(t)$ measurements and the well bottom hole pressure BHP(t), and on the other side, of the water liquid ratio $wlr_{time}$ determined via the water liquid ratio time profile extrapolated from preceding nuclear measurements. When the difference between these two calculated water liquid ratios is out of a determined precision range, a recommendation to perform nuclear measurements is activated. In case the well bottom hole pressure BHP(t) is unknown, then the well bottom hole pressure BHP is estimated during a nuclear measurement and assumed to be constant till the next one.

FINAL REMARKS

In the hereinbefore description and examples, the gas oil ratio GOR and the water liquid ratio have been presented as well characteristic information. However, it will be apparent for someone skilled in the art that other fluid relative parameters may be used. As an alternative to the gas oil ratio GOR, the gas liquid ratio $GLR=q_g/q_l$ may be used in the calculation of the gas phase, oil phase and water phase flow rate, respectively. The calculations are then based on sensibly the same equations which will not be further described in details. The values of the gas liquid ratio GLR have to be fixed with the help of field-derived information. As a result, the gas phase, oil phase and water phase flow rates are given with respect to the difference between the gas liquid ratio and the water liquid ratio, namely GLR-wlr.

As an alternative to the water liquid ratio wlr, the available well characteristic information may be, on some well sites, the water cut $\gamma_w$. In this case, the same methodology may be used for the water cut $\gamma_w$ as for the water liquid ratio wlr. Once the water cut time profile $\gamma_w(t)$ is determined, the water liquid ratio time profile wlr(t) can be deduced by using the following relation:

$$wlr = \frac{\gamma_w(GOR+1)}{1+GOR\gamma_w}$$

Then, the model equations are modified accordingly.

The invention has been described in particular with reference to an example of onshore hydrocarbon well application. However, it will be apparent for someone skilled in the art that the method and apparatus of the invention is also applicable to other oilfield applications, for example offshore hydrocarbon well applications.

The drawings and their description hereinbefore illustrate rather than limit the invention. Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A flow rate measuring method for a multiphase fluid mixture flowing in a line, the fluid mixture comprising at least a first and a second phase, the method comprising the steps of:
passing the fluid mixture through a first measuring device permanently installed on the line in which the fluid mixture is subjected to a pressure drop,
continuously measuring with said first measuring device a differential pressure across the first measuring device and a line pressure of the fluid mixture in the line,
calibrating the line with a second measuring device removably installed on an empty portion of the line,
punctually measuring at a determined instant with the second measuring device removably installed on a throat portion of the line at least one measured parameter of the fluid mixture correlated to the first phase quantity relatively to the second phase quantity,
continuously determining at least one estimated parameter of the fluid mixture correlated to the first phase quantity relatively to the second phase quantity based on the punctually measured parameter and an extrapolating scheme,
determining at least one phase flow rate based on the differential pressure across the first measuring device, the line pressure of the fluid mixture into the line and the at least one measured parameter of the fluid mixture when the second measuring device is installed on the line,
setting a flag that defines the determined instant when the second measuring device is installed on the line, the determined instant being defined when the flag has reached a determined flag value,
determining at least one phase flow rate based on the differential pressure across the first measuring device,
the line pressure of the fluid mixture into the line and the at least one estimated parameter of the fluid mixture when the second measuring device is removed from the line.

2. The flow rate measuring method of claim 1, wherein the fluid mixture is a hydrocarbon multiphase fluid mixture comprising a liquid phase and a gas phase, the liquid phase comprising an oil phase and a water phase.

3. The flow rate measuring method of claim 1, wherein the first measuring device is a differential pressure device selected from the type list constituting of: Venturi tube, nozzle, orifice plate.

4. The flow rate measuring method of claim 1, wherein the second measuring device is a nuclear measuring arrangement.

5. The flow rate measuring method of claim 1, wherein the at least one estimated parameter of the fluid mixture correlated to the first phase quantity relatively to the second phase quantity is the water liquid ratio.

6. The flow rate measuring method of claim 5, wherein the water liquid ratio is determined by extrapolation of a plurality of future values of water liquid ratio based on a plurality of preceding measured parameter of the fluid mixture.

7. The flow rate measuring method of claim 5, wherein the water liquid ratio is calculated based on a well equation and on a measurement of a well bottom hole pressure.

8. The flow rate measuring method of claim 1, wherein the at least one parameter of the fluid mixture correlated to the first phase quantity relatively to the second phase quantity is the gas oil ratio.

9. The flow rate measuring method of claim 8, wherein the gas oil ratio is assumed to be constant between two consecutive installations of the second measuring device on the line.

10. The flow rate measuring method of claim 1, wherein the flag is an error value associated with the estimated parameter and the determined instant is defined when the error value has reached a determined error level.

11. The flow rate measuring method of claim 1, wherein the flag is the differential pressure across the first measuring device and the determined instant is defined when the differential pressure across the first measuring device has deviated from some determined value by a determined amount.

12. The flow rate measuring method of claim 1, wherein the method further comprises the step of:
- determining a discrepancy between the estimated parameter of the fluid mixture correlated to the first phase quantity relatively to the second phase quantity and the measured parameter of the fluid mixture correlated to the first phase quantity relatively to the second phase quantity,
- determining a time period separating two consecutive installations of the second measuring device on the line by a trial and error method consisting in increasing said time period for a small discrepancy and decreasing said time period for a large discrepancy.

13. A flow rate measuring apparatus for a multiphase fluid mixture flowing into a line, the fluid mixture comprising at least a first and a second phase, the apparatus comprising:
- a first measuring device permanently installed on the line, said first measuring device comprising a restriction in the line for subjecting the fluid mixture to a pressure drop, and said first measuring device measuring continuously a differential pressure across the first measuring device and a line pressure of the fluid mixture in the line,
- a second measuring device removably positionable on an empty pipe portion of the line for performing a calibration on the line, and on a throat portion of the line for punctually measuring at a determined instant at least one measured parameter of the fluid mixture correlated to the first phase quantity relatively to the second phase quantity,
- an electronic arrangement for continuously determining at least one estimated parameter of the fluid mixture correlated to the first phase quantity relatively to the second phase quantity based on the punctually measured parameter and an extrapolating scheme, and for determining at least one phase flow rate based on the differential pressure across the first measuring device, the line pressure of the fluid mixture into the line and the at least one measured parameter of the fluid mixture when the second measuring device is installed on the line, and for determining at least one phase flow rate based on the differential pressure across the first measuring device, the line pressure of the fluid mixture into the line and the at least one estimated parameter of the fluid mixture when the measuring device is removed from the line, and for determining a discrepancy between the at least one estimated parameter of the fluid mixture and the measured parameter of the fluid mixture and then by trial and error increasing or decreasing a time period of consecutive installations of the second measurement device based on a small or large, respectively, discrepancy.

14. The flow rate measuring apparatus of claim 13 wherein the first measuring device is a differential pressure device selected from the type list constituting of: Venturi tube, nozzle, orifice plate.

15. The flow rate measuring apparatus of claim 13, wherein the apparatus further comprises an empty pipe close to the throat.

* * * * *